United States Patent [19]
Suzuki

[11] Patent Number: 5,643,025
[45] Date of Patent: Jul. 1, 1997

[54] TRANSMISSION LUBRICATION SYSTEM

[75] Inventor: Takayoshi Suzuki, Shizuoka-ken, Japan

[73] Assignee: Sanshin Kogyo Kabushiki Kaisha, Hamamatsu, Japan

[21] Appl. No.: 593,895

[22] Filed: Jan. 30, 1996

[30] Foreign Application Priority Data

Jan. 31, 1995 [JP] Japan ................................. 7-013871

[51] Int. Cl.$^6$ ................................................. B63H 21/10
[52] U.S. Cl. ................... 440/88; 123/196 W; 184/6.18
[58] Field of Search ........................... 440/88, 89, 75; 123/196 W, 196 R; 184/6.18

[56] References Cited

U.S. PATENT DOCUMENTS

| | | | |
|---|---|---|---|
| 2,700,359 | 1/1955 | Dewhurst | ..................................... 440/88 |
| 3,647,024 | 3/1972 | Wick et al. | ........................ 123/196 W |
| 4,993,979 | 2/1991 | Bland et al. | ............................... 440/88 |

*Primary Examiner*—Jesus D. Sotelo
*Attorney, Agent, or Firm*—Knobbe, Martens, Olson & Bear LLP

[57] ABSTRACT

A lubricating and drive system for a marine propulsion transmission that is comprised of an upper reversing transmission and a lower final drive transmission. A lubricant pump is driven off an input shaft to the reversing transmission for supplying lubricant for actuating its clutches and also for lubricating its gears. The pickup for the lubricant pump is disposed at a lower position in the final drive gear case so as to maintain a low lubricant level therein when the unit is operating so as to reduce drag.

10 Claims, 4 Drawing Sheets

TRANSMISSION LUBRICATION SYSTEM

BACKGROUND OF THE INVENTION

This invention relates to a transmission lubrication system and more particularly to a transmission lubrication system particularly adapted for use with marine outboard drives.

In one form of marine outboard drive, the lower unit contains a bevel gear transmission which drives one or more propellers in selected directions. With this type of transmission there is frequently provided at the upper end of the unit a further transmission which may include the actual clutches and/or the reversing transmission for effecting the selected forward and reverse drives. Frequently, this type of arrangement employs a hydraulic pump that is driven off of the rear of the input shaft for this upper transmission and which draws lubricant from the lower unit transmission for actuating the clutches and/or lubricating components of the upper transmission.

Such a general environment may be best understood by reference to FIG. 1 of the drawings, which is a partially schematic cross-sectional view through an inboard/outboard drive that may be constructed either in accordance with the prior art or which may embody the present invention.

Referring specifically to this figure, an inboard/outboard drive which may be utilized with watercraft is identified generally by the reference numeral 11. This inboard/outboard drive includes an internal combustion engine 12 that is mounted forwardly of the transom of the associated propelled watercraft and within its hull. The engine 12 has an output shaft 13 that extends rearwardly through the transom and which is connected to a universal joint 14. The universal joint 14 transmits propulsion power to an input shaft 15 of a reversing transmission, indicated generally by the reference numeral 16, and which forms a portion of an outboard drive unit 17.

Although the invention is described in conjunction with an inboard/outboard drive, certain facets of the invention may be employed with outboard motors per se, as long as they incorporate a hydraulic pump disposed at the upper end of the outboard drive and a transmission at the lower end from which lubricant is drawn by the pump.

Continuing to describe this construction shown in FIG. 1, the input shaft 15 has journaled upon it a pair of bevel gears 18 and 19, which may be considered to be the forward drive and reverse drive gears, respectively. These gears 18 and 19 are constructed so as to be journaled on the input shaft 15 so that the input shaft 15 may rotate relative to the gears 18 and 19.

A hydraulically operated clutching mechanism, indicated generally by the reference numeral 21 and which may be of any known type utilized in this art, is provided in the reversing transmission 16. This hydraulically actuated clutching mechanism 21, which is actuated in a manner which will be described, selectively couples one of the gears 18 or 19 to the input shaft 15 so as to rotate with it.

The bevel gears 18 and 19 are enmeshed with opposite sides of a driven bevel gear 22. This driven bevel gear 22 is affixed for rotation with the upper end of a drive shaft 23 that is journaled within a drive shaft housing of the outboard drive 17. Because the gears 18 and 19 are enmeshed with diametrically opposite sides of the driven bevel gear 22, the direction of rotation of the driven bevel gear 22 and drive shaft 23 will depend upon which of the gears 18 or 19 is coupled for rotation with the input shaft 15.

As has been previously noted, the gear 18 is a forward drive gear, and when coupled to the shaft 15, the drive shaft 23 will be driven in a forward propulsion mode. In a like manner, when the reverse bevel gear 19 is coupled for rotation with the input shaft 15, the drive shaft 23 will be driven in a reverse drive mode.

In the illustrated embodiment, the propulsion unit 11 includes a pair of counter-rotating propellers comprised of a forward propeller 24 and a rearward propeller 25. The forward propeller 24 is coupled to a tubular shaft 26 that extends forwardly and is connected to a first bevel gear 27 of a final drive assembly, indicated generally by the reference numeral 28.

The rearward propeller 25 is coupled to an inner drive shaft 29 about which the tubular drive shaft 26 rotates. This drive shaft 29 is affixed to a second bevel gear 31. As a result of this arrangement, the propellers 24 and 25 will both be driven simultaneously when the drive shaft 23 is driven, but will rotate in opposite directions. The propellers 24 and 25 are of an opposite hand so that they will both provide a driving force when driven in either the forward or reverse directions.

As has been noted, the clutch actuating mechanism 21 is hydraulically operated. The hydraulic fluid for its operation is contained within the lower final drive 28 and is drawn upwardly to a hydraulic pump 32 which is driven off of the input shaft 15. A selector gear is provided for actuating either the clutch associated with the forward drive gear 18 or the clutch associated with the reverse drive gear 19, depending upon the operator's selection. The fluid in the clutch which is not energized is dumped back to the lower unit final drive 28.

The reversing transmission 16 and specifically the gears 18, 19 and 22 are also lubricated by means including the pump 32. Thus some of the pump output is delivered to these gears.

The disadvantages of the prior art type of construction may be best understood by reference to FIG. 2, which is a large schematic view, in part similar to FIG. 1, but shows in more detail how the fluid is circulated.

The same reference numerals are applied to FIG. 2 as are utilized in FIG. 1 to identify the various components. In this figure, however, only a single propeller drive illustrated because this is the more conventional type of arrangement, and the final drive for driving the propeller shaft 31 is identified by the reference numeral 51. The transmission is still indicated by the reference numeral 28. It will be seen that a supply conduit 52 extends through the outboard drive unit 17 from an area at the upper end of the transmission casing 28 and connects to the fluid pump 23. This supply conduit has an inlet opening 53 disposed at the upper end of the case.

In addition to supplying lubricant for actuating the clutches 21 and as has been noted, the pump 32 also supplies lubricant that lubricates the gears within the reversing transmission 16. These gears are, therefore, contained within their own housing. A return conduit 54 extends from this housing back to the final drive housing 28 and discharges into the gear case containing the final drive transmission 28.

As indicated in FIG. 2, any air present in the prior art type of construction will tend to be drawn through the inlet opening 53 and delivered to the pump 32 through the conduit 52. To minimize the amount of air so drawn, it is the practice to totally submerge the lower unit, final drive transmission 28 in lubricant. In other words, the lubricant fills the total lower unit. This has a distinct advantage in that it means that the gears therein are totally immersed in lubricant, even though this much lubricant is not required for their lubrication. Therefore, there will be a large drag on the gears.

In addition, there is always the danger that as the lubricant level falls, no lubricant will be supplied to the reversing transmission 16 or available for actuation of the clutches 21.

It is, therefore, a principal object of this invention to provide an outboard drive transmission of this general type, but wherein these disadvantages are avoided.

It is a further object of this invention to provide an improved transmission lubrication system for a marine outboard drive wherein adequate lubrication is provided, but wherein drag on the gears lubricated can be reduced by avoiding submerging them completely in lubricant at least when the unit is being driven.

It is a further object of this invention to provide an improved hydraulic clutch actuating mechanism associated with a transmission wherein the clutch can be supplied with sufficient fluid for actuation, but wherein the transmission drag losses are substantially reduced.

SUMMARY OF THE INVENTION

This invention is adapted to be embodied in a marine outboard drive transmission wherein a lower unit contains a gear transmission for driving at least one propeller through a pair of intermeshing bevel gears. This final drive transmission is driven by a drive shaft that extends vertically through the housing and which is coupled to an input shaft for operation. A pump is contained within this upper unit and is driven off of one of the shafts contained therein for supplying lubricant for system operation. In accordance with the invention, the pump draws lubricant from the lower unit final drive at a point that is disposed below the axis of rotation of the propeller shaft so as to ensure that lubricant will always be available and also to minimize the amount of lubricant that must be maintained in the lower unit final drive.

BRIEF DESCRIPTION OF THE DRAWINGS

FIG. 14 is an enlarged cross-sectional view taken along the line 4—4 of FIG. 3 and shows the manner of oil pick up for the hydraulic pump arrangement.

DETAILED DESCRIPTION OF THE PREFERRED EMBODIMENT OF THE INVENTION

Referring now in detail to the remaining figures, and particularly to FIGS. 3–6, the actual physical construction of the lower unit shown schematically in FIG. 1 will be described, and the overall construction will be described by reference to FIG. 7, which is a view similar to the prior art view of FIG. 1, but shows how this invention alleviates the problems of the prior art constructions.

Figure 1:
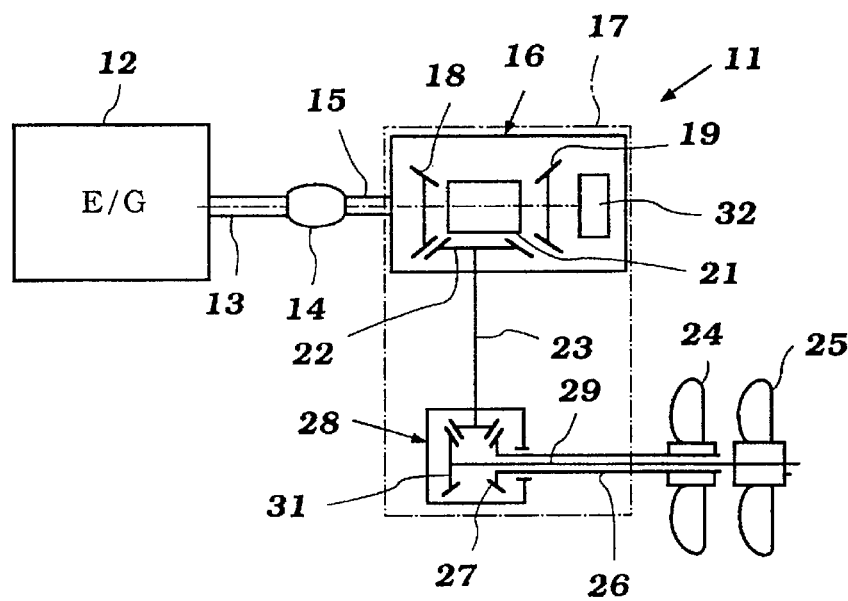
FIG. 1 is a partially schematic view showing a general type of reversing transmission constructed in accordance with an embodiment of the invention and illustrating the problems with the prior art construction.
Figure 2:
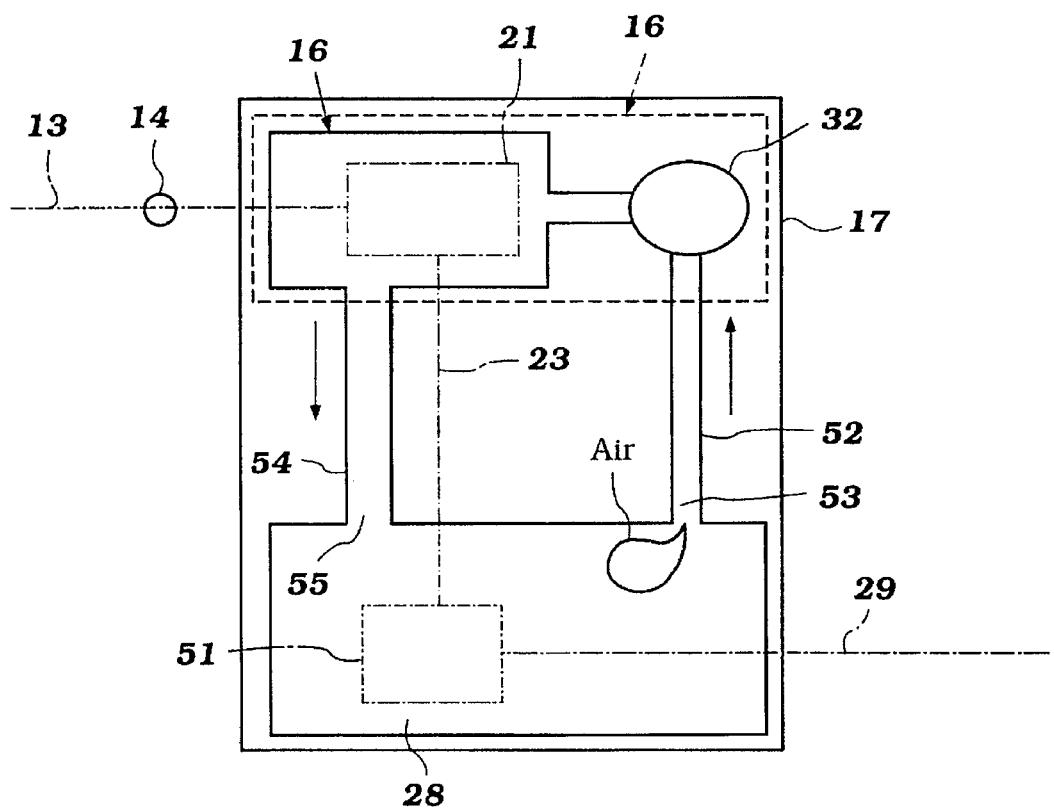
FIG. 2 is a schematic view, in part similar to FIG. 1 but on a larger scale, and shows the prior art type of constructions and the disadvantages associated with them.

In describing the specific physical embodiment, where components have already been described either in conjunction with the prior art construction or the schematic illustration of FIG. 1, the same reference numerals have been applied and will be utilized in this description.

Figure 3:
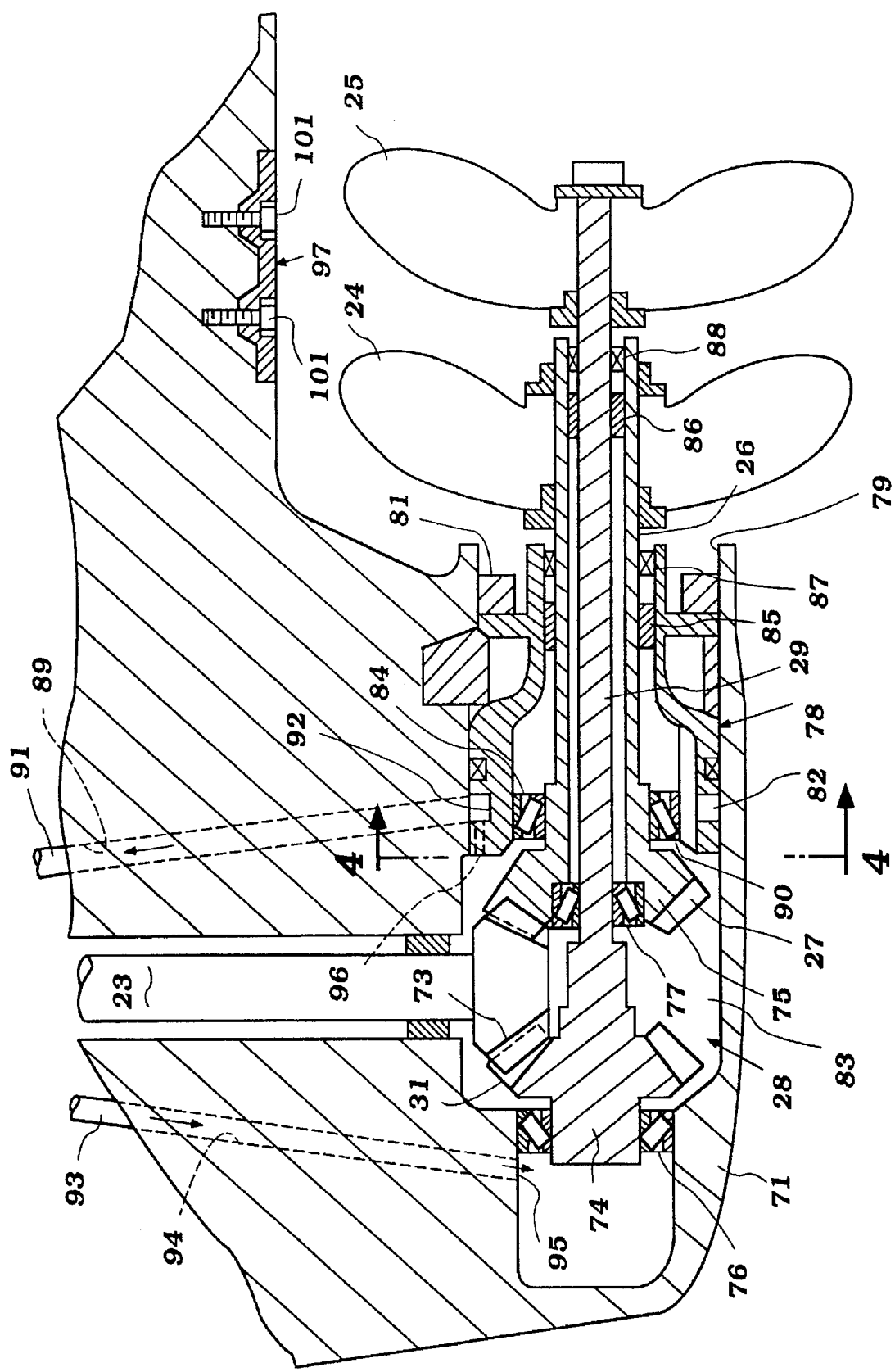
FIG. 3 is an enlarged cross-sectional view taken along a plane parallel to the plane of FIG. 1, but shows the actual transmission in non-schematic fashion.
Figure 4:
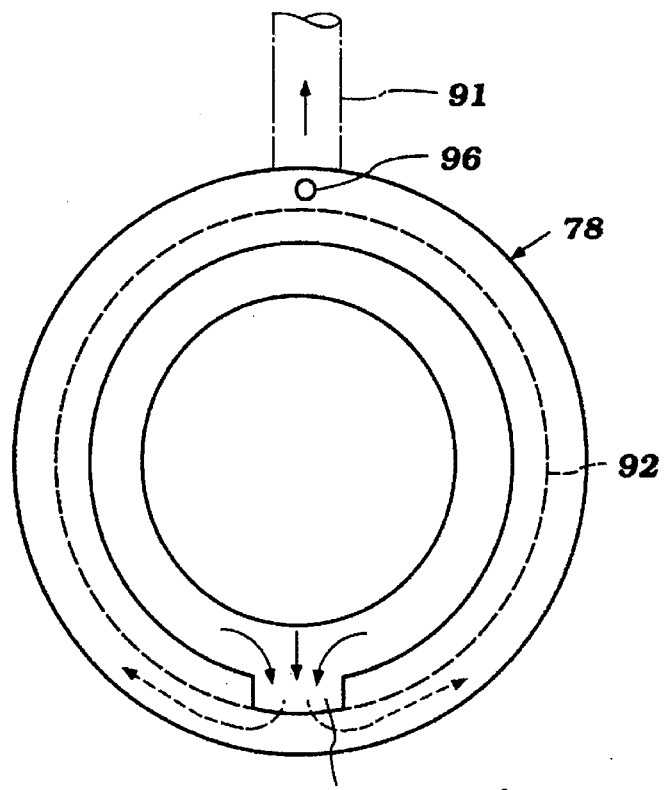
Figure 5:
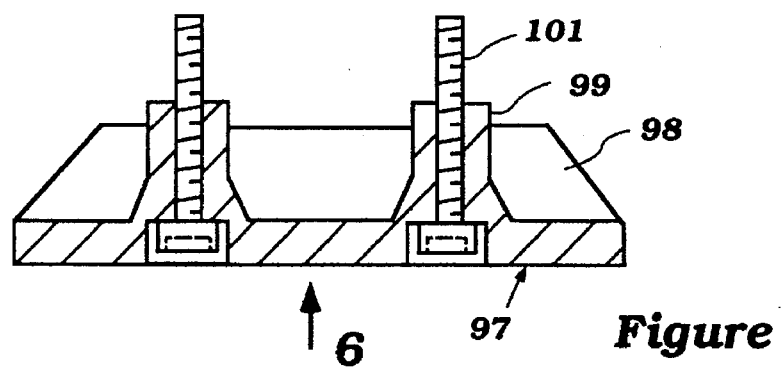
FIG. 5 is a cross-sectional view taken along the same plane as FIG. 3, but shows only the sacrificial anode construction and is on a larger scale than FIG. 3.
Figure 6:
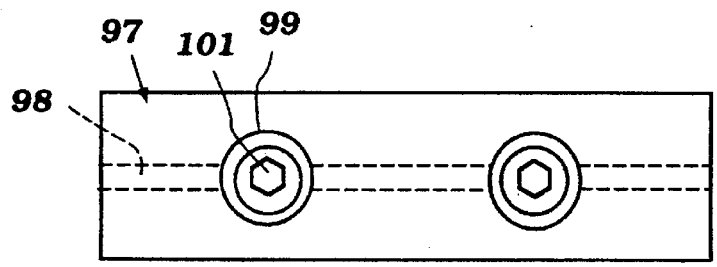
FIG. 6 is a view of the sacrificial anode looking in the direction of the arrow 6 in FIG. 5.

Referring first specifically to FIG. 3, it will be seen that the lower unit 28 has an outer housing 71 in which the final drive 28 is located. The drive shaft 23 has a driving bevel gear 73 affixed to it which is enmeshed with the driven bevel gears 27 and 31 for the front and rear propellers 24 and 25, respectively. The gear 31 has a hub portion 74 which is affixed to or formed integrally with the propeller shaft 29 which drives the rear propeller 25. The gear 27 has a hub portion 75, which is also affixed to or formed integrally with the tubular propeller shaft 26 that drives the front propeller 24.

A first thrust bearing 76 supports the hub 74 of the driven bevel gear 31 in the housing 71. A second thrust bearing 77 is interposed between the hub 75 of the driven bevel gear 27 and the propeller shaft 29 for further journaling the propeller shaft 29 and for journaling the front end of the tubular propeller shaft 26.

A bearing carrier 78 is affixed within an annular opening 79 formed at the rear of the lower unit outer housing 77. A retaining ring 81 holds this bearing carrier 78 in position in the opening 79. The forward end-of the bearing carrier 78 is provided with a seal 82 which seals a gear casing 83 in which the final drive 28 is positioned.

A forward trust bearing 84 is provided between the hub 75 of the driven bevel gear 27 and the bearing carrier 78 for journaling the forward end of the tubular drive shaft 26. A needle-type bearing 85 is disposed between the rearward portion of the bearing carrier 78 and this tubular drive shaft 26. Finally, a further needle bearing 86 is interposed between the rear end of the tubular drive shaft 26 and the solid drive shaft 29 so as to complete the journaling of the shafts.

A seal 87 is provided around the rear end of the bearing carrier 78 and the tubular drive shaft 26 so as to seal the interior of the gear cavity 83. A similar seal 88 is disposed between the outer end of the tubular drive shaft 26 and the solid drive shaft 29 so as to complete the sealing of this cavity 83.

Figure 7:
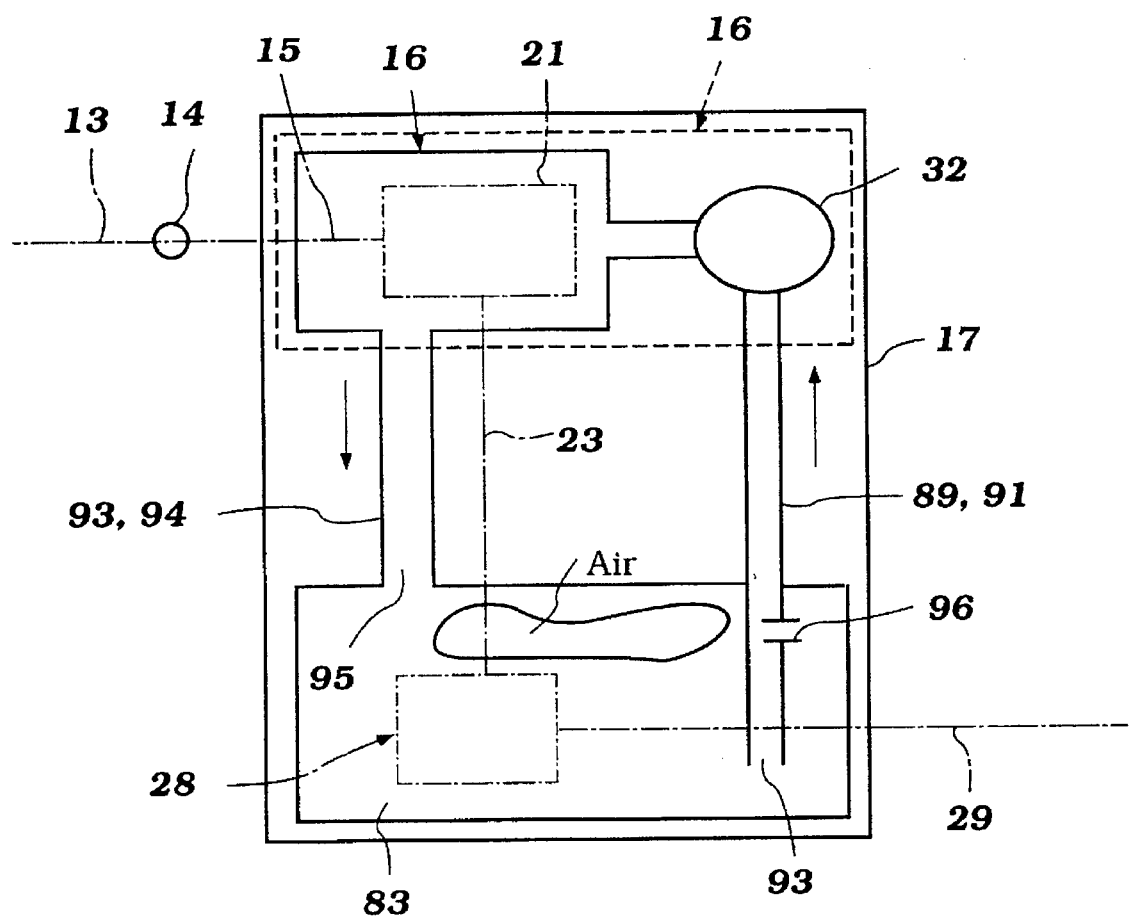
FIG. 7 is a schematic view, in part similar to FIG. 2, but shows how the instant invention avoids the problems attendant with the prior art constructions.

The lower unit outer housing 71 is formed with a drilled passageway 89 that communicates with a conduit 91 that extends upwardly through the drive shaft housing and which is connected at its upper end to the pump 32, which is shown schematically in FIG. 7.

As previously noted, the pump 32 supplies lubricant to the clutches 21 of the reversing transmission 16 for their actuation, and also lubricates the gears 18 and 19 of this transmission. The design is such that the amount of lubricant supplied will fill the casing in which the reversing transmission is contained only partially and at a level below that of the input shaft 15. In this way, drag on the gears of the reversing transmission 16 will be reduced without adversely affecting the lubrication of these gears.

The drilled passageway 89 communicates with a larger diameter portion of the bearing carrier 78, and specifically with an oil pick-up groove 92 formed therein. At its lower end, the groove 92 communicates with and passes through to a slot 90 which extends axially along the lower face of the bearing carrier 78. Thus the groove 92 opens directly into the gear cavity 83, but as its lower end. As will be seen, the opening of the slot 90 into the gear case 83 is well below the axis of the drive shafts 26 and 29, but is above the lower peripheral edges of the driven bevel gears 27 and 31.

The configuration is chosen so that when the engine is running and the pump 32 is pumping fluid, the level of lubricant in the gear case 83 will be below the shafts 29 and 26, but above the lower edges of the gears 27 and 31. As a result, these gears will be lubricated and will carry lubricant to the driving bevel gear 73 so as to lubricate it. However, the amount of lubricant will not submerge the gears 31 and 27 to any significant extent. Hence drag on the drive will be substantially reduced from the prior art type of constructions.

The reversing transmission 21 is provided with a drain conduit 93 which extends from a point somewhat above the lower peripheral edge of its gears and which extends into a drilled passage 94 formed in the lower unit which drains back into the gear case 83 through a return opening 95. Thus, when the outboard drive is not being driven and the pump 32 is not pumping lubricant, the level of lubricant in the gear case 83 will be higher than that when the pump 32 is being driven.

In order to assure a more rapid delivery of lubricant to the pump 32 on startup and to ensure that the cavity 83 will be pumped down as soon as possible, a further passage 96 is drilled through one end face of the bearing carrier 78 and opens into the gear case 83 above the level of the drive shafts 26 and 29. Hence, on original startup the passage 96, which intersects the groove 92, will deliver lubricant as well as that which flows through the inlet channel 90. However, as soon as the lubricant level falls below the drilling 96, only air will be drawn through this passage. The passage 96 is, therefore, sized so that it will permit lubricant to flow, but the amount of air which passes in with the lubricant once the lubricant level drops will be reduced so as to ensure adequate lubrication and enough lubricant pressure to actuate the clutches of the reversing transmission 16.

Referring specifically to FIGS. 3–6, a sacrificial anode, indicated generally by the reference numeral 97, is provided and which is attached to the outer housing 71 of the lower unit adjacent the propellers 24 and 25. This sacrificial anode 97 is provided with a rib 98 and a pair of bosses 99 that pass threaded fasteners 101 for detachably affixing the sacrificial anode in place and for facilitating replacement.

From the foregoing description, it should be readily apparent that the described construction provides a good source of lubricant for lubrication of the final drive reversing transmission and a source of liquid for fluid-actuated clutches. However, the construction is such that drag on the gears will be reduced, since the liquid is maintained at a relatively low level when the unit is operating. Of course, the foregoing description is that of a preferred embodiment of the invention, and those skilled in the art will readily understood how variations may be made without departing from the spirit and scope of the invention, as defined by the appended claims.

What is claimed is:

1. A marine propulsion transmission system comprised of a final drive consisting of a pair of intermeshing bevel gears, one of said bevel gears being fixed for rotation to a marine propulsion device drive shaft, said gears being contained within a gear casing, a lubricant pump disposed vertically above said gear casing and driven along with one of said gears for pumping lubricant, and a pick-up conduit extending from the inlet of said pump to a position in said gear case disposed below the axis of rotation of said propulsion device shaft.

2. A marine propulsion transmission system as in claim 1, wherein the pick-up conduit has a first inlet opening disposed at a lower portion of the gear case and a second pick-up opening disposed at an upper portion of said gear case for assisting in the speed of pumping down of the amount of lubricant in the gear case upon operation of the pump.

3. A marine propulsion transmission system as in claim 2, wherein the second higher level opening is more restricted than the lower level opening.

4. A marine propulsion transmission system as in claim 1, wherein the fluid pump supplies lubricant for actuating a clutch.

5. A marine propulsion transmission system as in claim 4, wherein the fluid pump is disposed in an upper gear case containing a reversing transmission, the clutches of which are actuated by said fluid pump and the gears of which are lubricated by the lubricant pumped by said pump.

6. A marine propulsion transmission system as in claim 5, wherein the reversing transmission comprises an input shaft coupled to said fluid pump for driving said fluid pump and on which a pair of reversing transmission bevel gears rotate, said reversing transmission bevel gears being drivably connected to a driving bevel gear affixed for rotation with a lower unit drive shaft, which lower unit drive shaft drives the final drive, said reversing transmission bevel gears being disposed on opposite sides of said driving bevel gear with the fluid clutches being disposed between said reversing transmission bevel gears for coupling said reversing transmission bevel gears selectively to said input shaft for driving said lower unit drive shaft.

7. A marine propulsion transmission system as in claim 6, wherein the pick-up conduit has a first inlet opening disposed at a lower portion of the gear case and a second pick-up opening disposed at an upper portion of said gear case for assisting in the speed of pumping down of the amount of lubricant in said gear case upon operation of the pump.

8. A marine propulsion transmission system as in claim 7, wherein the second higher level opening is more restricted than the lower level opening.

9. A marine propulsion transmission system as in claim 7, wherein the final drive drives a pair of counter-rotating propellers and comprises a first final drive bevel gear coupled for rotation with the drive shaft and a pair of driven final drive bevel gears engaged with said first final drive bevel gear on diametrically opposite sides thereof and each connected to a respective propeller for driving the propeller.

10. A marine propulsion transmission system as in claim 9, wherein the pick-up conduit has a first inlet opening disposed at a lower portion of the gear case and a second pick-up opening disposed at an upper portion of the gear case for assisting in the speed of pumping down of the amount of lubricant in the gear case upon operation of the pump.

* * * * *